Figure 1:
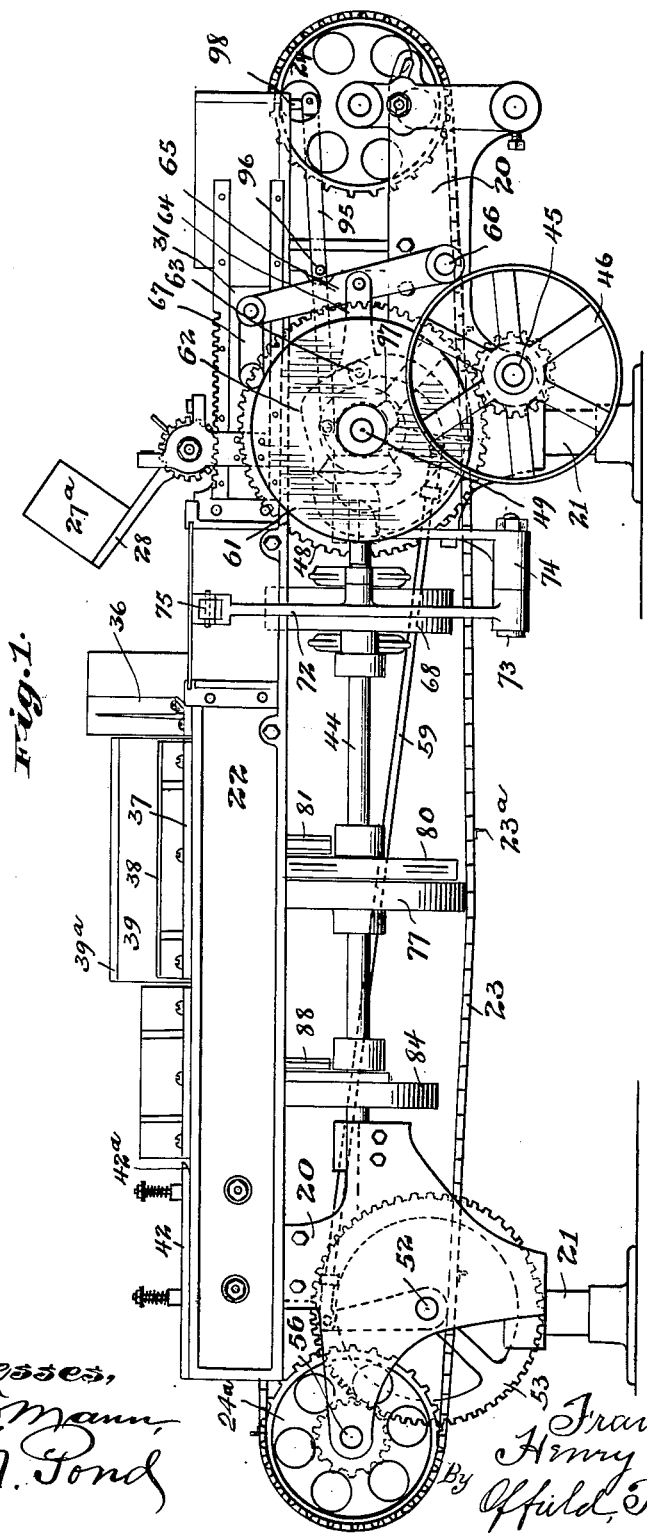

No. 860,764. PATENTED JULY 23, 1907.
F. M. PETERS & H. H. HUNGERFORD.
MACHINE FOR FOLDING AND TUCKING CARTONS AND THE LIKE.
APPLICATION FILED NOV. 11, 1903.

9 SHEETS—SHEET 1.

No. 860,764. PATENTED JULY 23, 1907.
F. M. PETERS & H. H. HUNGERFORD.
MACHINE FOR FOLDING AND TUCKING CARTONS AND THE LIKE.
APPLICATION FILED NOV. 11, 1903.

9 SHEETS—SHEET 4.

Witnesses.
Inventors,
Frank M. Peters,
Henry H. Hungerford,

No. 860,764. PATENTED JULY 23, 1907.
F. M. PETERS & H. H. HUNGERFORD.
MACHINE FOR FOLDING AND TUCKING CARTONS AND THE LIKE.
APPLICATION FILED NOV. 11, 1903.

9 SHEETS—SHEET 5.

No. 860,764.  
PATENTED JULY 23, 1907.  
F. M. PETERS & H. H. HUNGERFORD.  
MACHINE FOR FOLDING AND TUCKING CARTONS AND THE LIKE.  
APPLICATION FILED NOV. 11, 1903.

9 SHEETS—SHEET 6.

Witnesses,  
Inventors,  
Frank M. Peters,  
Henry H. Hungerford,  
By Offield, Towle & Linthicum  
Attys.

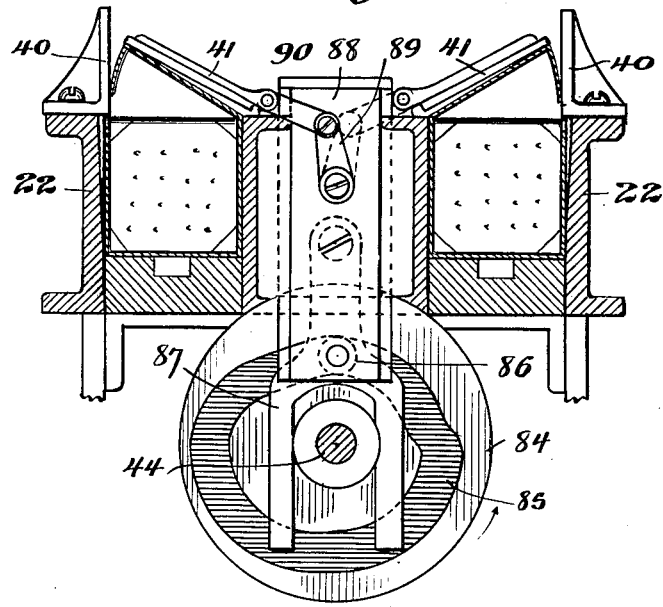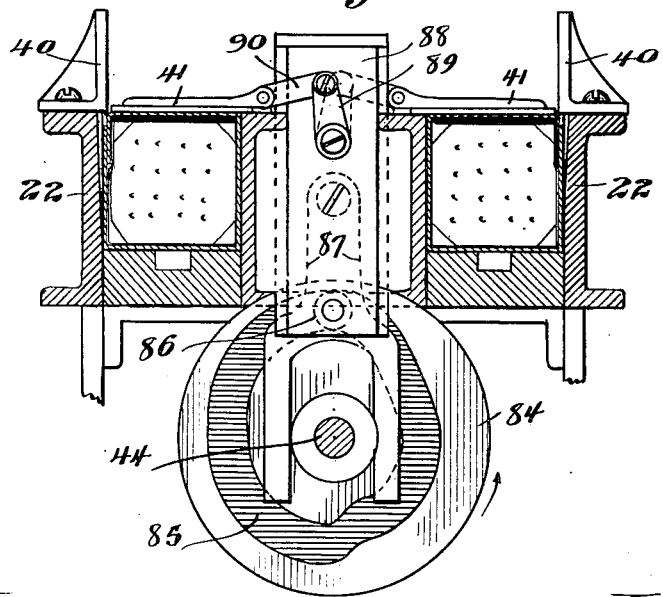

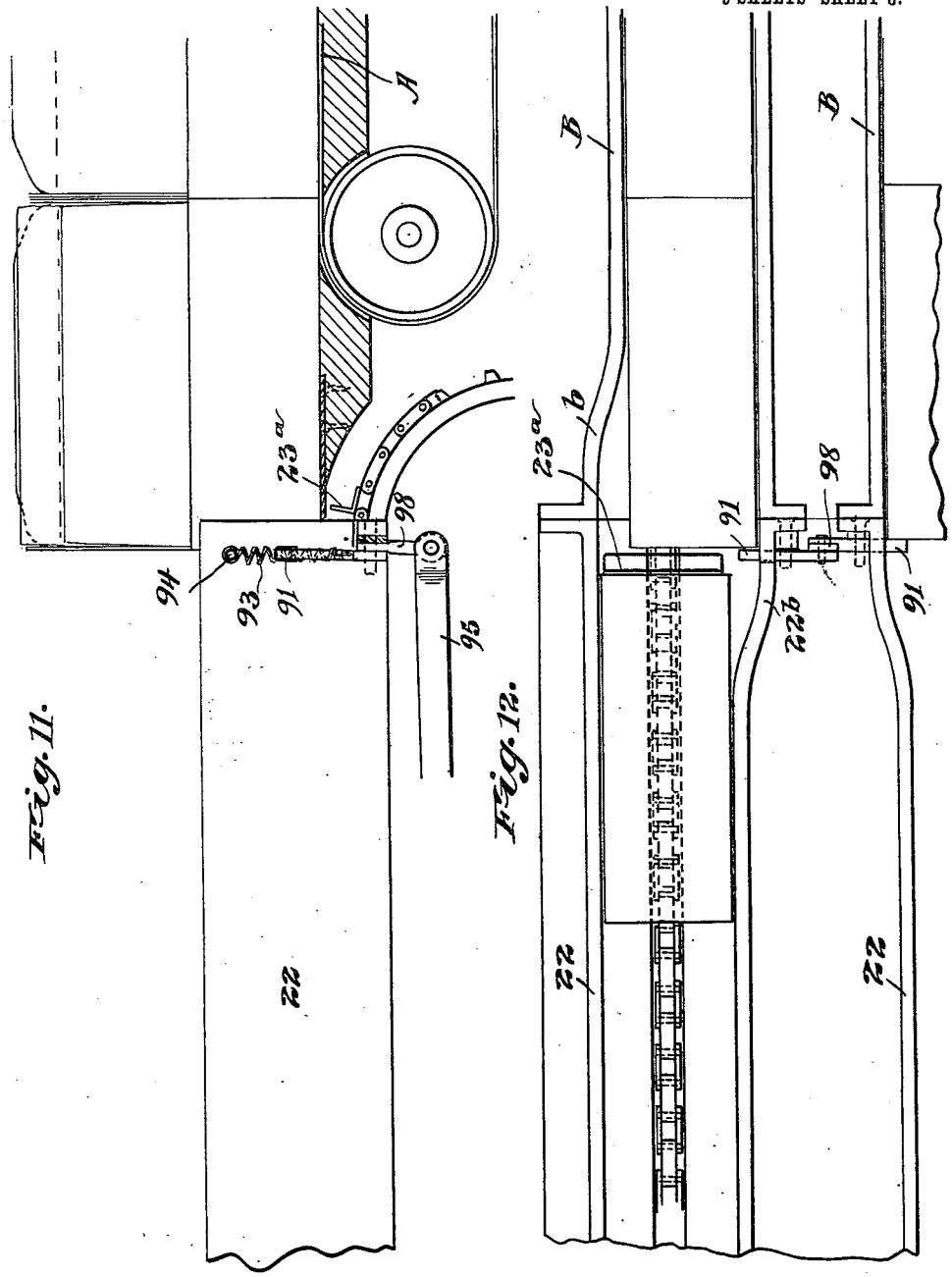

No. 860,764. PATENTED JULY 23, 1907.
F. M. PETERS & H. H. HUNGERFORD.
MACHINE FOR FOLDING AND TUCKING CARTONS AND THE LIKE.
APPLICATION FILED NOV. 11, 1903.
9 SHEETS—SHEET 9.
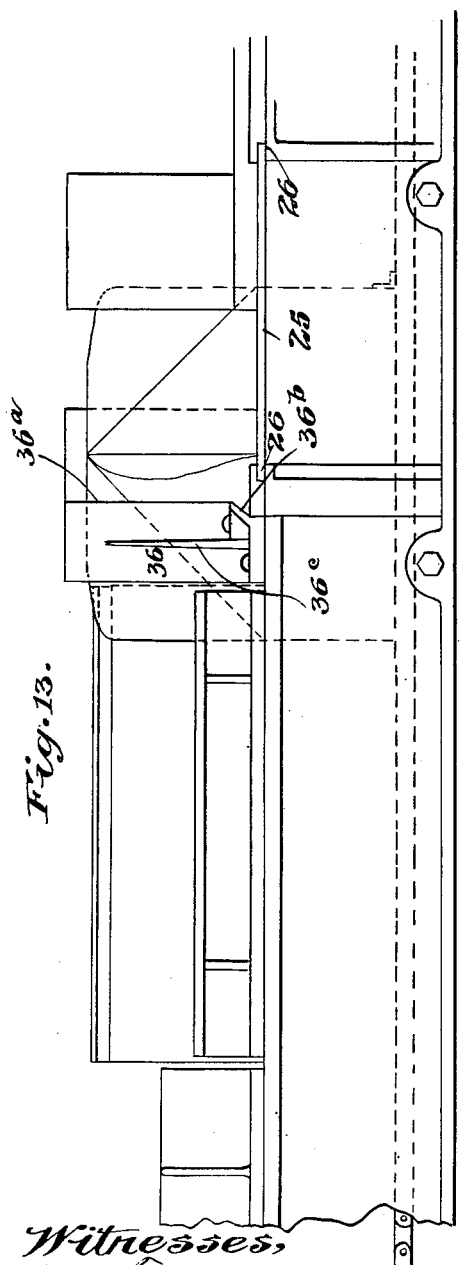
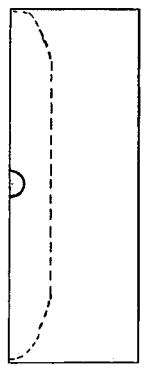
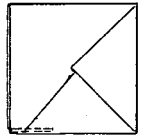

UNITED STATES PATENT OFFICE.

FRANK M. PETERS AND HENRY H. HUNGERFORD, OF CHICAGO, ILLINOIS; SAID HUNGERFORD ASSIGNOR TO SAID PETERS.

MACHINE FOR FOLDING AND TUCKING CARTONS AND THE LIKE.

No. 860,764.      Specification of Letters Patent.      Patented July 23, 1907.

Application filed November 11, 1903. Serial No. 180,732.

*To all whom it may concern:*

Be it known that we, FRANK M. PETERS and HENRY H. HUNGERFORD, both citizens of the United States, residing at Chicago, in the county of Cook and State of Illinois, have invented certain new and useful Improvements in Machines for Folding and Tucking Cartons and the Like, of which the following is a specification.

Our invention relates to machines employed in the packaging of food products and similar goods which are customarily put up in paste-board cartons of uniform sizes and capacity, and in such form placed upon the market; and the machine constituting the subject-matter of our present invention has for its object to effect the final closing and tucking in of those members of the carton and of its inner protective lining (where the latter is employed) which constitute the top and marginal lip of the carton as finally closed.

Our invention has been designed more especially for use in connection with the packaging of bakery products, such as crackers, cakes, biscuits, and the like, although its capability is by no means limited to service in such a field; and the machine hereinafter described and claimed is designed to receive the carton after the latter has been charged with the goods which it is desired to contain, and to present a filled carton in a completely folded and closed condition, in which, either with or without an outer sealed wrapper, it may be placed upon the market.

With this object in view our present invention resides in a machine which effects a series of folding and tucking operations upon the carton, the principal of which, in the order in which they are carried out, consist of, first, a folding inwardly and downwardly of one longitudinal upstanding margin of the protective lining; second, a turning inwardly and downwardly of one of the end folds of the carton; third, a similar turning inwardly and downwardly of the opposite end fold of the carton; fourth, a partial bending down of the top longitudinal fold of the carton and the simultaneous formation on the free longitudinal margin thereof of a tucking lip or flap; fifth, a complete turning down of said top longitudinal fold of the carton with the simultaneous tucking in against the inner surface of the opposite end wall of said longitudinal lip; and, finally, a flattening and compacting into final form of the parts thus brought together; it being understood that in connection with the several operations hereinabove enumerated the upstanding portion of the protective lining (where such is employed) lying against the side and end flaps constituting the top wall of the carton is bent, folded and tucked in simultaneously with the corresponding operations upon the end and side flaps of the carton itself.

A machine embodying the invention in the best form which we have as yet devised is shown in the accompanying drawings, wherein,—

Figure 2:
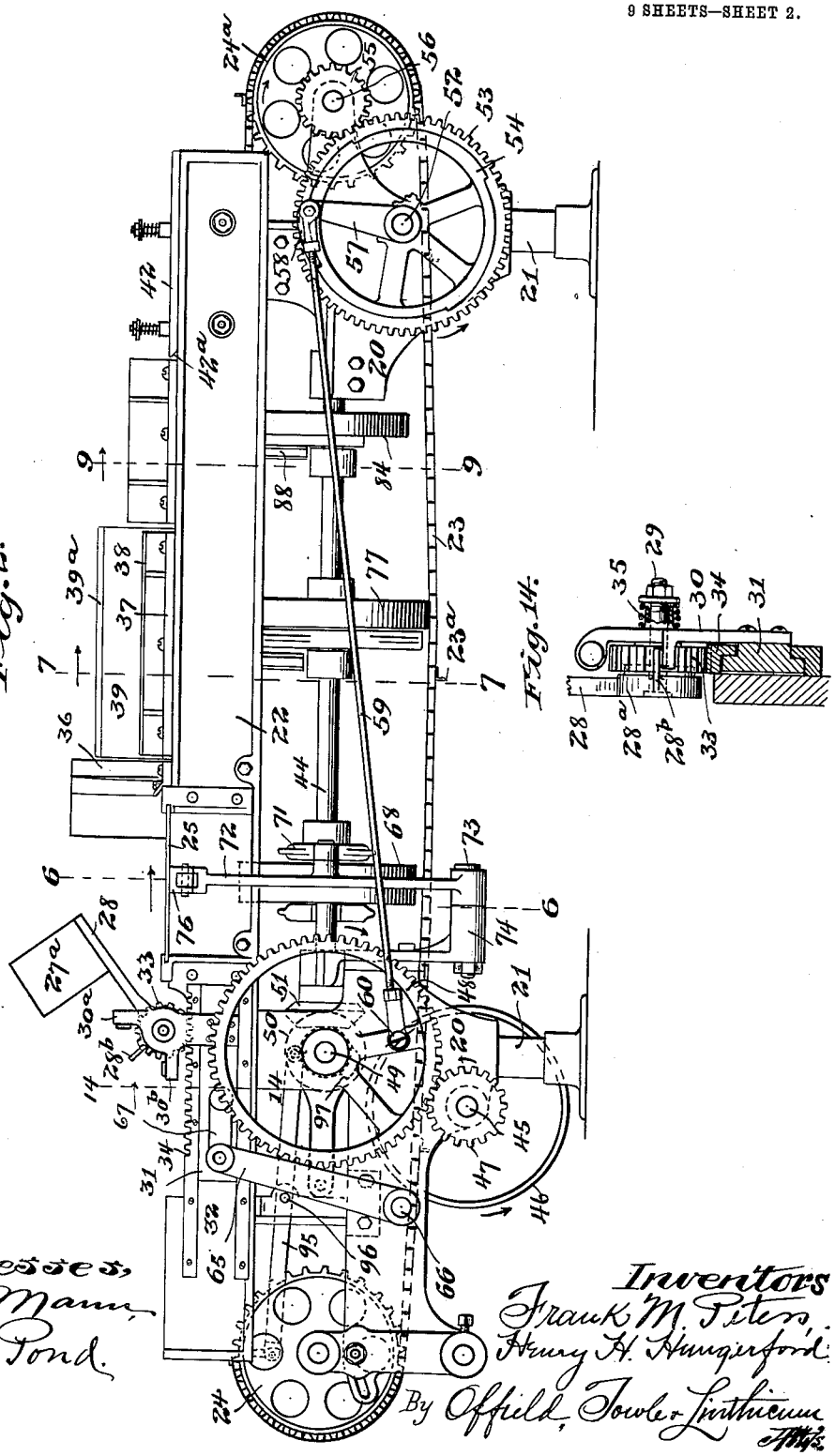
Figure 3:
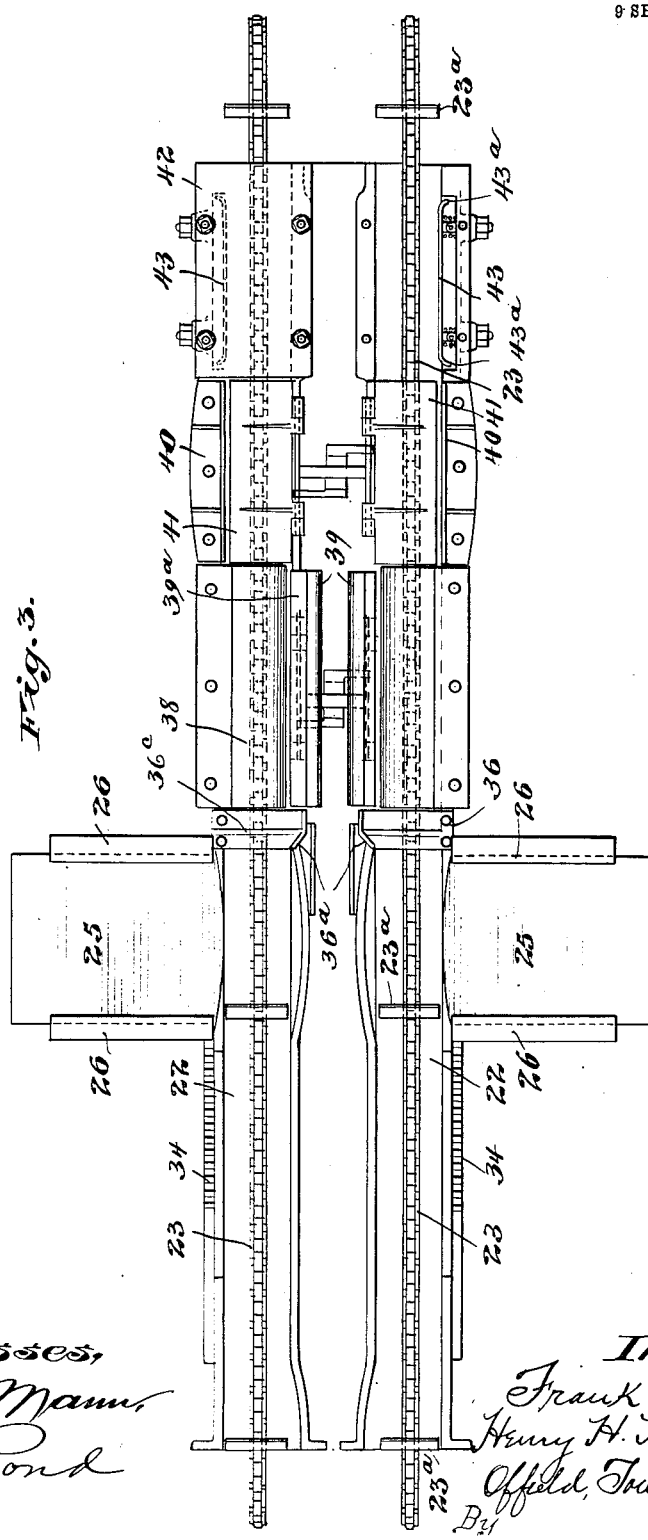
Figure 4:
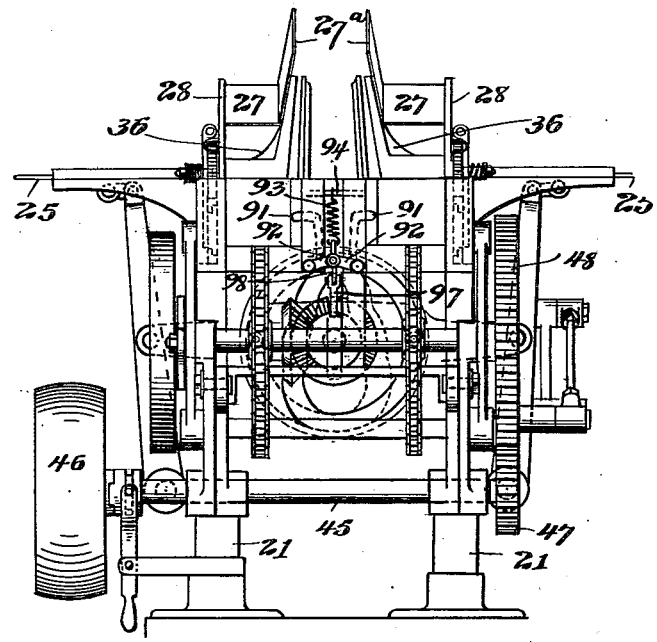
Figure 5:
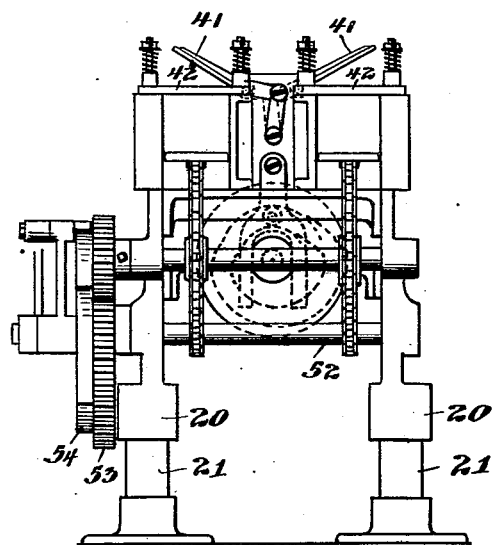
Figure 6:
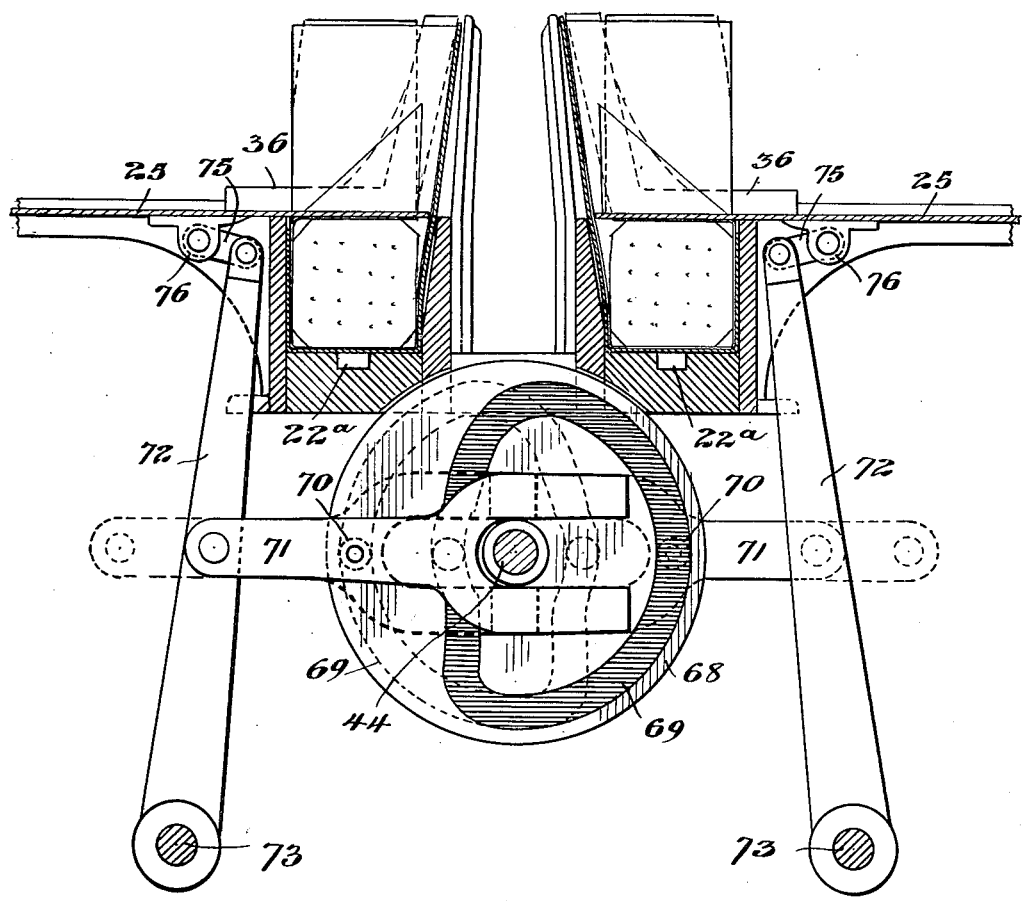
Figure 7:
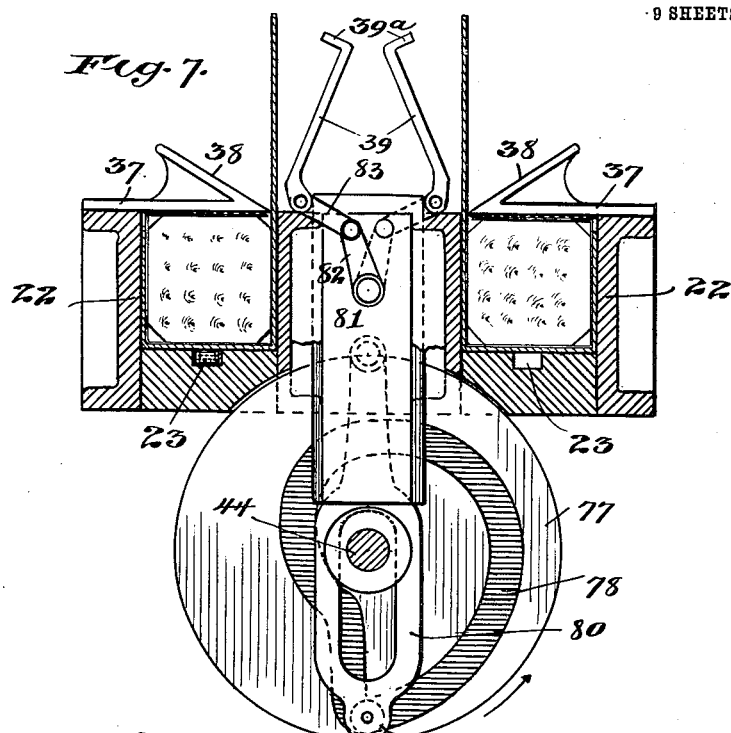
Figure 8:
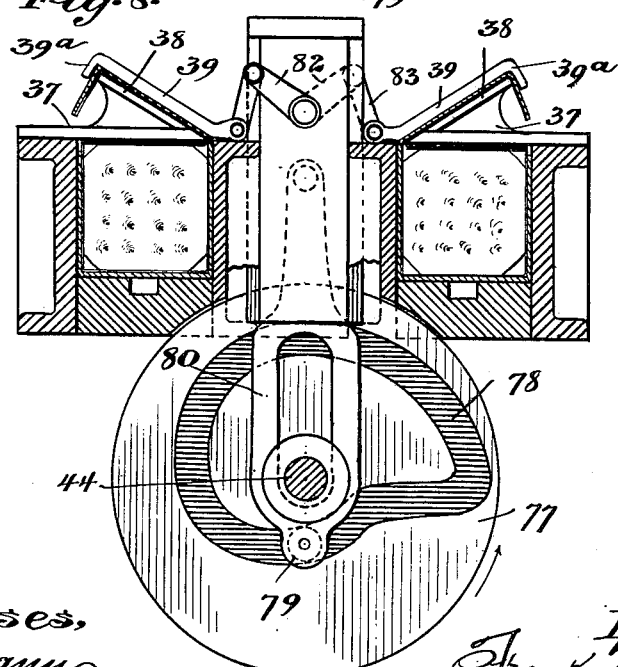

Figure 1 is a side elevational view of the complete machine; Fig. 2 is a similar view of the machine from the opposite side thereof; Fig. 3 is a top plan view with certain parts removed for the sake of greater clearness; Fig. 4 is a front end elevational view; Fig. 5 is a rear end elevational view; Fig. 6 is an enlarged cross-sectional view on the line 6—6 of Fig. 2, looking in the direction of the arrow; Fig. 7 is an enlarged cross-sectional view on the line 7—7 of Fig. 2, looking in the direction of the arrow; Fig. 8 is a view similar to Fig. 7 illustrating an advanced position of the movable parts; Fig. 9 is an enlarged cross-sectional view on the line 9—9 of Fig. 2, looking in the direction of the arrow; Fig. 10 is a view similar to Fig. 9, illustrating an advanced position of the movable parts; Fig. 11 is an enlarged fragmentary view in side elevation of the receiving end of the machine, and illustrating the manner in which the cartons are fed thereto; Fig. 12 is a top plan of the parts shown in Fig. 11; Fig. 13 is a fragmentary side elevational view, similar to Fig. 11, of an intermediate portion of the machine, more particularly illustrating the means for turning down the end flaps of the carton; Fig. 14 is a detail view, enlarged, on the line 14—14 of Fig. 2, viewed in the direction of the arrow; and Figs. 15 and 16 are end and side elevational views, respectively, of the closed and tucked package in the form in which it is discharged from the machine.

Referring to the drawings, 20 designates the main frame of the machine, which may be supported at its opposite ends on suitable pedestals 21. For the sake of economy of material and construction the machine is preferably made double, and is herein so shown and described, since a single set of main operating and driving connections can be made to serve the twin longitudinally-arranged series of mechanisms that operate directly upon the cartons; but it will, of course, be understood that the machine may be constructed in unitary or single form if desired within the spirit and purview of the invention. The super-structure of the machine is chiefly characterized by the presence on, and supported by, the front and rear frame members 20 of a pair of twin parallel longitudinally-disposed guide-chutes designated as an entirety by 22, grooved longitudinally of their bottoms as shown at 22ª, in which travel a pair of endless sprocket-chains 23, respectively, each of which is provided on its outer face with a series of equally-spaced flights 23ª, which latter are of substantially the width of the chutes 22 through which they travel. The chains 23 are carried on sprocket-wheels 24 and 24ª at the front and rear ends of the machine, respectively; and the office of the flights 23ª is to engage the respective cartons as they enter the guide-chutes 22 and advance them step by step to the operation of the several folding, tucking and pressing devices.

Referring now to the mechanisms for performing the several operations hereinabove enumerated, and describing them in the order named, 25 designates each of a pair of plates slidably mounted in horizontal guides 26 disposed transversely of the machine on either side thereof, the inner ends of the plates 25 being slightly convexed, as shown in Fig. 3, and adapted to reciprocate directly across the upper portions of their respective chutes. The office of each of these reciprocating plates is to bend down the upstanding longitudinal side member of the inner protective lining, so as to cause the same to lie directly over and upon the goods in the package.

The rear end flaps of the carton, and that portion of the protective lining lying within the same is adapted to be pressed downwardly by means of presser-plates 27 (Fig. 4), each of which is mounted upon and extends inwardly of the outer free end of an arm 28, the hub of which arm, as best shown in Fig. 14, is mounted to oscillate upon a spindle 29, itself mounted in a standard 30 carried by a slide 31 that engages a slide-way 32 formed in or on the outer face of the side wall of the guide-chute adjacent to its package-receiving end, as shown in Fig. 2. The hub of the arm 28, designated by 28ᵃ (Fig. 14), frictionally engages the adjacent face of a pinion 33 also mounted on the spindle 29 and meshing with a rack 34 formed on the upper edge of the guide-way 32. The hub 28ᵃ and pinion 33 are normally pressed together by a spring 35 surrounding the outer projecting end of the spindle 29 in the manner plainly indicated in Fig. 14. The hub 28ᵃ has a radial projection 28ᵇ that is adapted to alternately make contact with a pair of stops 30ᵃ and 30ᵇ projecting at right angles to each other from the standard 30 in the path of oscillation of the projection 28ᵇ. From this construction it will be seen that as the pinion is moved back and forth over the rack by the slide 31 and standard 30, the arm 28 and its attached presser-plate 27 will be oscillated between a vertical and a horizontal position; while any excess travel of the slide and standard will involve simply a bodily movement of the arm and presser-plate owing to the provision for a relative slip between the frictionally-engaging parts 28ᵃ and 33. On the inner ends of the plates 27 and at approximately right angles thereto are extensions in the form of wings 27ᵃ, the function of which is to crease and smooth down the rear diagonal fold of the inner lining lying against the longitudinal side flap of the carton at the same time that the end flaps are depressed.

The forward end flap of the carton, together with that portion of the inner protective lining upstanding thereagainst is folded down during the subsequent forward movement of the carton which carries said parts beneath a stationary member so shaped and disposed as to effect this result. This member, designated as an entirely by 36 (see Figs. 1, 2, 3, 4 and 13) consists essentially of an angle-shaped block rigidly secured to and across each of the guide-chutes just beyond that portion of the latter which is traversed by the reciprocating folder-plates 25. The inner vertical member of this block is provided with a bevel 36ᵃ (Fig. 3), and the horizontal member is provided with a similar bevel 36ᵇ (Fig. 13) both of these bevels being formed on that edge of the block which first receives and engages the oncoming package. The vertical and horizontal members of the angle block are herein shown as reinforced by a diagonal web 36ᶜ (Fig. 13). As the advance end of the package or carton passes beneath this member 36, the horizontal beveled edge 36ᵇ automatically folds down the end flap and the underlying portion of the protective lining, while the vertical beveled edge 36ᵃ coöperates in folding over and smoothing down that portion of the protective lining that is turned back diagonally against the inner face of the longitudinal flap which is still upstanding, as plainly indicated in Fig. 13. It will thus be understood that as the carton emerges from beneath the stationary folder 36 the two end flaps have been folded down flat, while the upper and outer diagonal halves of the protective lining have been folded over upon the inner and lower diagonal halves thereof, all as indicated in Fig. 13.

The next operation in order is the partial bending down of the upstanding longitudinal flap which, when fully turned down, constitutes the outer top cover of the package, and the simultaneous formation on the outer longitudinal margin thereof of the lip which is subsequently tucked inside the opposite vertical wall of the box. The mechanism for carrying out this step is as follows: Referring more particularly to Figs. 7 and 8, 37 designates each of a pair of plates secured to the upper outer side walls of the guide-chutes, respectively, just beyond the stationary folders 36, and extending inwardly nearly across the chutes, with sufficient space for the passage past their inner longitudinal edges of the vertical wall of each carton which is integral with the flap to be folded down. Each of these plates supports thereabove an inclined impression-plate 38 formed integral therewith or secured thereto, said impression-plate corresponding in dimensions to that portion of the flap which ultimately constitutes the outer top wall or cover of the closed carton. Coöperating with these impression-plates 38 are a pair of presser-plates 39, each of which is hinged above the inner wall of the guide-chute directly opposite the lower margin of the impression-plate, and is capable of being swung down to lie flat upon the latter, and is further provided on its outer longitudinal edge with a downwardly-turned lip or flange 39ᵃ, which, when the presser-plate is folded down upon the bed 38, is adapted to overhang the outer elevated edge of the latter and thus create the marginal tucking lip on the flap subjected to its operation, in the manner clearly shown in Fig. 8; while at the same time the top flap or cover is creased to form its proper line of junction with the vertical end wall of the carton by the coöperation of the heel of the presser-plate with the lower margin or edge of the impression-bed or plate.

The carton, having been subjected to the operation last described, passes thence under the next forward impulse of the intermittently moving conveyer-chain 23 to a mechanism which completes the downward folding of the top flap or cover and the tucking in of the lip. This last described mechanism is best illustrated, as to its mode of operation, in Figs. 9 and 10, wherein it will be seen that the outer vertical walls of the guide-chutes are provided with vertical extensions in the nature of guide-pieces 40 located just beyond the impression-plates 37, 38 last described; while hinged on the opposite upper margins of the inner walls of the chutes, just beyond and substantially in line with the presser-plates 39 are auxiliary presser-plates 41, also corresponding substantially in dimensions with the dimensions of the carton members operated upon thereby. By reference to Figs. 9 and 10 it will be observed that the presser-plates 41 serve to engage the partly depressed covers of the cartons as the latter pass off the impression-plates 38, and force the same down into horizontal closing position, while at the same time the vertical guides 40 coöperate with the presser-plates 41 in tucking the marginal lips of the covers inside the opposite end wall of the carton, said guides serving to properly direct the descending lip and prevent its interference with the upper edge of said opposite end wall.

The final operation, which is a desirable although not necessary step, comprises the compacting of the parts folded and tucked by the preceding operations, so as to give the closed package a neat and compact condition and appearance. This mechanism, which is located at the discharging end of the machine beyond the final folding and tucking mechanism last described, comprises, in the form herein shown, spring-pressed compression-plates 42 and 43 constituting, respectively, top and side walls of the guide-chute (Fig. 3). It will be observed that the ends of the vertical plates 43 are outwardly turned or beveled at 43ª, while the package-receiving end of the horizontal plate 42 is similarly beveled at 42ª (Figs. 1 and 2) to facilitate the entrance of the package without injury to the corners or margins of the advancing end of the latter. As the closed and tucked package is caused to travel through this final portion of the guide-chute, these compression-plates bear against the top and one side wall thereof with a force which may be regulated by a proper adjustment of the actuating-springs, thus compressing the package between said parts and the opposite stationary bottom and side wall of the chute and compacting the longitudinal walls of the closed package to such an extent as to give a neatly closed and finished effect and appearance without injury to the contents.

It is, of course, essential to the successful operation of a machine of this character that the several successively operating mechanisms be actuated with precision and in proper predetermined sequence. It therefore remains to describe the mechanism which we have devised and prefer to employ for actuating the several movable carton-engaging parts hereinbefore described.

44 designates a main power-transmitting shaft which is suitably journaled in the frame of the machine beneath and centrally between the guide-ways or chutes 22 and parallel with the latter. This shaft is driven from a transverse power-receiving shaft 45 carrying a clutch-operated driving-pulley 46 (Figs. 2 and 4) through a pinion 47 on the other end of the shaft 45, a gear 48 engaged by the pinion 47 and itself mounted on a transverse shaft 49, a bevel pinion 50 on said shaft 49, and a coöperating bevel gear 51 on one end of the shaft 44.

Referring first to the mechanism for transmitting motion to the conveyer-chains, 52 designates a transverse shaft underlying the rear or discharging end of the machine, on one end of which shaft is loosely mounted a gear 53, on the outer face of which is a ratchet-wheel 54 having four teeth spaced 90° apart. The gear 53 meshes with a pinion 55 fast on the outer end of the shaft 56 which carries the sprocket-wheels 24ª. Fast on the end of the shaft 52 is an arm 57 carrying at its outer end a pawl 58 that reciprocates back and forth over the periphery of the ratchet-wheel 54. This arm and pawl are connected by a rod 59 with a pin 60 on the outer face of the gear 48. It will thus be seen that the continuous rotation of the latter gear, through the connections described, effects an intermittent rotation of the ratchet-wheel 54, and a consequent intermittent or step-by-step travel of the conveyer-chains 23. Each step of this travel is of a sufficient extent to advance the successive cartons from one of the several mechanisms above described for effecting the successive operation upon the carton to the next.

Describing next the mechanism for effecting the reciprocation of the slides 31 and the parts carried thereby and also the oscillations of the presser-plates 27, 61 designates a solid disk fast on the end of the shaft 49 on the opposite side of the machine from the gear 48, and on the inner face of this disk is an irregular cam-groove 62, shown in dotted lines in Fig. 1. Within this groove travels a roller 63 on the face of a link 64, one end of which is forked and straddles the shaft 49 while its other end is pivoted to a lever-arm 65 that is fast on its lower end on a transverse shaft 66 and is pivotally connected at its upper end through a link 67 with the slide 31. The opposite end of the shaft 66 carries a duplicate of the lever-arm 65 and the link 67 to operate the companion slide 31 on that side of the machine, as shown in Fig. 2. The contour of the cam 62 is specially designed to effect the desired actuation of the presser-plates 27, 27ª, the movement of which it will be observed is a combined or compound oscillating and bodily forward and backward movement, which we have found to yield the best results in folding down the rear end flap of the carton and simultaneously effecting the desired folding and creasing of the inner lining sheet.

Referring now to the means for reciprocating the sliding folding-plates 25, which are best shown in the enlarged detail view, Fig. 6, 68 designates a solid disk fast on the shaft 44 beneath said plates, and having formed in its opposite faces inversely-arranged irregular cam-grooves 69. Within these grooves travel rollers 70 mounted on the inner faces, respectively, of a pair of links 71, the forked inner ends of which straddle and are guided upon the shaft 44 while their outer ends are pivoted to lever-arms 72 at their lower ends mounted on stub-shafts 73 carried by brackets 74 (Figs. 1 and 2), and at their upper ends pivotally connected by links 75 with ears 76 on the under sides of the plates 25. It will be seen that the shaft of the cam-groove 69 is such as to effect a comparatively quick inward and outward travel of the folding-plates 25, and to cause the latter to remain retracted a sufficient length of time to permit of the introduction of the successive cartons to the proper position to receive their action.

Figs. 7 and 8 illustrate in enlarged detail the mechanism employed to actuate the presser-plates 39. Referring thereto, 77 designates a solid disk fast on the shaft 44 directly beneath said presser-plates, which disk is provided in one face with a substantially semiheart-shaped cam-groove 78, in which travels a roller 79 on the lower end of a slotted link 80 which straddles the shaft 44, and which is pivoted at its upper end to a vertical slide 81 mounted in suitable guides or ways on the inner opposite side walls of the chutes 22. Pivoted on opposite sides of the slide 81 are links 82, the outer ends of which are connected to the rear extensions 83 of the presser-plates 39; as a result of which construction it will be seen that as the slide 81 rises the presser-plates 39 are quickly thrown down upon the impression-plates 38, suitably creasing and folding the upstanding member of the box lying between said parts.

Figs. 9 and 10 illustrate in enlarged detail the mechanism for actuating the auxiliary presser-plates 41, this mechanism being substantially similar to that last described. 84 designates a solid disk fast on the shaft 44 directly beneath said auxiliary presser-plates, this disk being provided in one face with an irregular cam-groove 85, in which travels a roller 86 on the face of an arm 87, the lower end of which is forked and straddles the shaft 44, while its upper end is pivoted to a vertical slide 88 mounted in suitable guides or ways on the inner opposite side walls of the chutes 22. Pivoted on the opposite sides of the slide 88 are links 89, the outer ends of which are connected to the rear extensions 90 of the auxiliary presser-plates 41. This construction effects an oscillation of the plates 41 between the positions indicated in Figs. 9 and 10, respectively, under which the top flaps or covers of the box are carried into a horizontal or closing position from the position at which they leave the impression-plates 38, and at the same time the marginal lips are tucked inside the upper edge of the opposite vertical wall, all as plainly shown in Fig. 10.

At the receiving end of the machine we provide a stop mechanism, under the action of which the cartons are admitted to the machine at proper intervals. This mechanism, which is illustrated in Figs. 1, 2, 4, 11 and 12, consists of a pair of bent fingers 91, the upper horizontal ends of which project through slots in the inner side walls of the guide-ways 22 at the receiving end of the latter, said fingers being pivoted at their lower ends in or to the lower portions of the inner vertical walls of the ways, as indicated in Fig. 4. From the pivot-shafts of the fingers a pair of arms 92 extend inwardly, being loosely connected at their inner or meeting ends. Attached to the pivot-pin of said joint is a spring 93 (Figs. 4 and 11), the upper end of which is secured to a transverse pin 94 lying between the opposite inner side walls of the chutes. This spring, through the connections described, normally tends to maintain the fingers inwardly of the chutes in blocking position. To withdraw said fingers at the desired times, we provide a lever 95 which is pivoted at 96 to a member of the frame underlying the space between the chutes, and has its inner end riding upon a cam-disk 97, shown by dotted lines in Figs. 1 and 2, mounted upon the shaft 49, while its outer end is connected by a link 98 with a pivot-pin that loosely unites the arms 92. It will thus be seen that as the cam-disk 97 rotates, the cam-projection thereof will periodically and at regular intervals raise the inner end of the lever 95, thereby depressing its outer end against the action of the spring 93, and withdrawing the stops 91 sufficiently to allow the cartons to pass thereby under the feeding action of an endless conveyer, such as is indicated at A in Figs. 11 and 12 in connection with a pair of introductory guide-chutes or ways B that lead to the receiving ends of the ways or chutes 22 of the machine proper. It will be observed by reference to Fig. 12 that the main guide-chutes 22 of the machine are slightly offset laterally relatively to their respective introductory guide-chutes B; and at the meeting point or junction between the two the outer wall of the introductory guide-chute is curved outwardly, as shown at $b$ to bring its meeting end into alinement with the meeting end of the straight outer wall of the main guide-chute 22, while the end portion of the inner wall of the latter is similarly curved, as shown at $22^b$, to bring its end into alinement with the meeting end of the inner wall of the auxiliary guide-chute. The end of the introductory guide-chute is elevated above the bottom of the main guide-chute. This construction serves as an auxiliary to the stop 91 in the manner hereinafter explained.

The operation of the several successively acting mechanisms of the machine has already been sufficiently set forth in connection with the descriptions thereof; but the operation and advantages of the machine as an entirety may be briefly outlined as follows: Power having been applied to the pulley 46, the filled packages are introduced to the receiving end of the machine in successive endwise-abutting order by the introductory conveyer A or other suitable means, each carton as it approaches the machine being temporarily stopped by one of the fingers 91 until the machine is ready to receive it. As soon as the finger 91 is withdrawn, the carton enters the chute 22 still under the impulse of the introductory conveyer A or other equivalent inserting means until it drops onto the bottom of the main guide-chute, and its rear lower margin is then engaged by one of the flights $23^a$, whereupon, by the next intermittent step of the conveyer 23, it is carried to a position directly opposite one of the folder-plates 25. During this introductory travel the forward end of the carton is thrust laterally into line with the main guide-chute 22, while its rear portion is emerging from the auxiliary chute B, the widened offset at the junction of the two chutes produced by the presence of the curved offset side walls $b$ and $22^b$ of the auxiliary and main chutes, respectively, permitting this gradual sidewise movement of the carton under the thrust of the stop-finger 91 against its inner side wall after its forward end has been released and passed by said stop-finger, which latter continues to press against the side wall of the carton during the remainder of its travel into the main guide-chute, thus thrusting the carton fully into line with the main guide-chute. As soon as the foremost carton has fully entered the main chute 22, the front end of the next succeeding carton, which is still in line with the auxiliary chute B, is arrested by the stop-finger 91, as fully shown in Fig. 12, and held in said arrested position until the guide-finger is again retracted for an instant to allow the front end of said carton to slip by the same, whereupon the last described operation is repeated upon the next and succeeding cartons, in turn. At the instant that each carton reaches its position opposite the folder-plate 25, the latter is actuated to fold down the inner upstanding longitudinal margin of the protective lining; and simultaneously therewith or shortly thereafter the slide 31 is moved inwardly, thereby, through the presser-plate 27, folding down the rear end flap with that fold of the protective lining lying thereagainst, and at the same time, through the action of the wing 27ª on the outer upstanding longitudinal portion of the protective lining, folding over the outer and upper diagonal half thereof, as plainly shown in Fig. 13. Upon the instant that the folder 25 and presser-plates 27, 27ª have performed their service, the conveyer advances the carton past and beneath the beveled faces 36ª and 36ᵇ of the stationary folder 36, which performs the functions last described upon the forward end flap and associated part of the protective lining. This done, the conveyer again advances the carton one step to a position opposite the presser-plate 39, which latter operates on the top flap or cover in the manner illustrated and described in connection with Figs. 7 and 8; whereupon the conveyer again advances the carton one step to a position opposite the auxiliary presser-plate 41, which effects the final folding and tucking, as illustrated and described in connection with Figs. 9 and 10. Thereafter the conveyer advances the folded and closed carton into the compression chamber at the discharging end of the machine, where it is allowed to remain for a period corresponding to the period of operation of each of the mechanisms through which the carton has previously passed, after which it is discharged by the conveyer onto any suitable or convenient receiver. From this it will be seen that a number of cartons may always pass through the machine in close succession, each carton, as it advances from one mechanism to the next, making place for the carton immediately following. The several mechanisms are all so accurately timed as to their operations that no time is lost in the passage of each carton through the machine except such as is absolutely necessary to transfer the carton from each operating mechanism to the next.

While we have illustrated and described a form of the invention adapted to operate upon a box or carton provided with an inner protective lining, it will nevertheless be understood that the construction and operation of the machine would be substantially the same were the inner lining omitted, except as to the necessity for the folder-plates 25; and these would still be employed in connection with cartons having a vertical extension on each longitudinal side wall constituting, when folded down, a double top or cover. It is also evident that the machine as described might be considerably modified in respect to mechanical details, especially of the actuating connections that perform the several folding, pressing and tucking functions, without at all departing from the gist and spirit of the invention, or in the least sacrificing the benefits and advantages thereof. Hence, we do not limit the invention to such details of construction, except to the extent that they are made the subject of specific claims.

We claim:

1. In a machine of the character described, the combination with a guide-way or chute adapted for the reception of an open carton having upstanding portions adapted to constitute a cover or closure, of mechanism located in the path of the carton through said guide-way for holding and pressing down certain of said upstanding portions, and mechanism also located in the path of said carton through said guide-way for forming a tucking-flap along the free edge of the other of said upstanding portions, substantially as described.

2. In a machine of the character described, the combination with a guideway or chute adapted for the reception of an open carton having upstanding portions adapted to constitute a cover or closure, of mechanism located in the path of the carton through said guide-way for folding and pressing down certain of said upstanding portions, mechanism also located in the path of the carton through said guide-way for forming a tucking flap along the free edge of the other of said upstanding portions, and mechanism for folding and pressing down said last-mentioned upstanding portions and inserting said tucking flap into the carton, substantially as described.

3. In a machine of the character described, the combination with a guide-way or chute adapted for the reception of an open carton having upstanding portions adapted to constitute a cover or closure, of mechanism located in the path of the carton through said guide-way for folding and pressing down certain of said upstanding portions, and mechanism also located in the path of said carton through said guide-way for forming a tucking flap along one of the free edges of the other of said upstanding portions, substantially as described.

4. In a machine of the character described, the combination with a guide-way or chute adapted for the reception of an open carton having upstanding portions adapted to constitute a cover or closure, of mechanism located in the path of the carton through said guide-way for folding and pressing down certain of said upstanding portions, and mechanism also located in the path of the carton through said guide-way for forming a tucking flap along the edge of the other of said upstanding portions opposite to their folded or hinged edges, substantially as specified.

5. In a machine of the character described, the combination with a guide-way or chute adapted for the reception of an open carton, having a plurality of upstanding portions adapted to constitute a cover or closure, of mechanism located in the path of the carton through said guide-way for folding and pressing down certain of said upstanding portions, and mechanism also located in the path of the carton through said guide-way for forming a tucking flap along one of the free edges of one of said upstanding portions, substantially as specified.

6. In a machine of the character described, the combination with a guide-way or chute adapted for the reception of an open carton having upstanding portions at its opposite ends and one of its sides adapted to constitute a cover or closure, of mechanism located in the path of the carton through said guide-way for folding and pressing down said upstanding end portions, and mechanism also located in the path of the carton through said guide-way for forming a tucking flap along the edge of said upstanding side portions, substantially as described.

7. In a machine of the character described, the combination with a guide-way or chute adapted for the reception of an open carton having a plurality of upstanding portions adapted to constitute a cover or closure, of mechanism located in the path of the carton through said guide-way for folding and pressing down certain of said upstanding portions, mechanism also located in the path of the carton through said guide-way for forming a tucking flap along one of the free edges of one of said upstanding portions, and mechanism for folding and pressing down said last-mentioned upstanding portion and inserting said tucking flap into the carton, substantially as described.

8. In a machine for folding and tucking cartons having protective linings, the combination with a guide-way or chute, and means for advancing the cartons therethrough, of mechanism mounted thereon to fold down an upstanding side portion of the lining, mechanism for subsequently folding down thereupon one end flap of the carton and lining and simultaneously folding one end of the side flap of the lining against the upstanding side flap of the carton, mechanism for subsequently folding down the other end flap of the carton and lining and simultaneously folding the other end of the side flap of the lining against said side flap of the carton, mechanism for folding down upon said folded end portions the side flap of the carton and lining, and mechanism for compressing and compacting the parts thus folded, substantially as specified.

9. In a machine for folding and tucking cartons having protective linings, the combination with a guide-way or chute, and means for advancing the cartons therethrough, of mechanism mounted thereon to fold down an upstanding side portion of the lining, mechanism for subsequently folding down thereupon one end flap of the carton and lining and simultaneously obliquely folding one end of the side flap of the lining against the upstanding side flap of the carton, mechanism for subsequently folding down the other end flap of the carton and lining and simultaneously obliquely folding the other end of the side flap of the lining against said side flap of the carton, mechanism for folding down upon said folded end portions the side flap of the carton and lining, and mechanism for compressing and compacting the parts thus folded, substantially as described.

10. In a machine for closing and tucking cartons which have upstanding side and end portions adapted to constitute elements of the top coverings of the cartons when closed, the combination with a guide-way or chute and means for advancing the cartons therethrough, of mechanism mounted thereon to fold down an upstanding side portion of each carton, mechanism for subsequently folding down thereupon one of the end portions, mechanism for subsequently folding down the other end portion, mechanism for bending down the opposite side portion and simultaneously creasing the same to form a marginal tucking-flap thereon, mechanism for subsequently folding down said opposite side portion upon said folded end portions and simultaneously inserting said tucking-flap, and mechanism for finally compressing and compacting the parts thus folded, substantially as described.

11. In a machine for folding and tucking cartons having protective linings, the combination with a guide-chute and means for advancing an open carton therethrough, of a stationary folder mounted upon and across said guide-chute and provided with substantially horizontal and vertical beveled edges, respectively, whereby, as the carton is moved endwise therebeneath, the upstanding forward end flap of the latter is folded down into closing position and simultaneously the lining is folded obliquely against an upstanding side flap, substantially as described.

12. In a machine for the purpose described, the combination with a guide-chute and means for advancing an open carton therethrough, of a stationary impression-plate mounted above said guide-chute, a hinged presser-plate having a depending flange on its outer margin mounted opposite the lower edge of said impression-plate, and means for oscillating said presser-plate toward and from said impression-plate whereby to bend down an upstanding side flap of the carton and simultaneously form on the free longitudinal margin of the latter a tucking-flap, substantially as described.

13. In a machine for the purpose described, the combination with a guide-chute and means for advancing an open carton therethrough, of a stationary inclined impression-plate mounted above said guide-chute, a hinged presser-plate having a depending flange on its outer margin mounted opposite the lower edge of said inclined impression-plate, means for oscillating said presser-plate toward and from said impression-plate whereby to bend down an upstanding side flap of the carton and simultaneously form on the free longitudinal margin of the latter a tucking-flap, an auxiliary presser-plate hinged longitudinally of said guide-chute beyond said first-named presser-plate, a vertical tucking-flap guide mounted on the other side wall of the guide-chute opposite said auxiliary presser-plate, and means for oscillating the latter whereby to press said side and tucking-flaps into closing position, substantially as described.

14. In a machine for the purpose described, the combination with a guide-chute, means for advancing an open carton therethrough, and mechanisms located along said guide-chute for bending and folding into closed position upstanding side and end flaps of the carton, of spring-pressed plates disposed above and across said guide-chute and in a side wall of the latter, respectively, beyond said bending and folding mechanisms, and serving to finally compress and compact the closed carton, substantially as described.

15. In a machine for the purpose described, the combination with a main guide-chute and mechanisms located therealong for operating upon cartons or the like, of an introductory guide-chute for the cartons, mechanism associated therewith for continuously advancing the cartons therethrough, and an intermittently retractable stop finger at the entrance of the main guide-chute engaging first the forward end and subsequently the side of the successive cartons, substantially as described.

16. In a machine for the purpose described, the combination with a main guide-chute and mechanisms located therealong for operating upon cartons or the like, of an introductory guide-chute for the cartons laterally offset relatively to said main guide-chute, mechanism associated therewith for continuously advancing the cartons therethrough, an intermittently retractable stop finger at the entrance of the main guide-chute, and means for actuating the stop finger to first restrain the cartons and subsequently force them sidewise into the main guide-chute, substantially as described.

17. In a machine for the purpose described, the combination with a main guide-chute and mechanisms located therealong for operating upon cartons or the like, said main guide-chute having a widened receiving end, of an introductory guide-chute for the cartons laterally offset relatively to said main guide-chute and having a widened discharge end registering with said widened receiving end of the main guide-chute, mechanism associated with said introductory guide-chute for continuously advancing the cartons therethrough, and an intermittently retractable stop at the entrance of the main guide-chute controlling the admission of the successive cartons to the latter, substantially as described.

FRANK M. PETERS.
HENRY H. HUNGERFORD.

Witnesses:
SAMUEL N. POND,
FREDERICK C. GOODWIN.